Aug. 2, 1949.  S. D. POOL  2,478,009
COOPERATIVE FEEDING AUGER FOR HARVESTER PLATFORMS
Filed Dec. 21, 1946  2 Sheets-Sheet 1
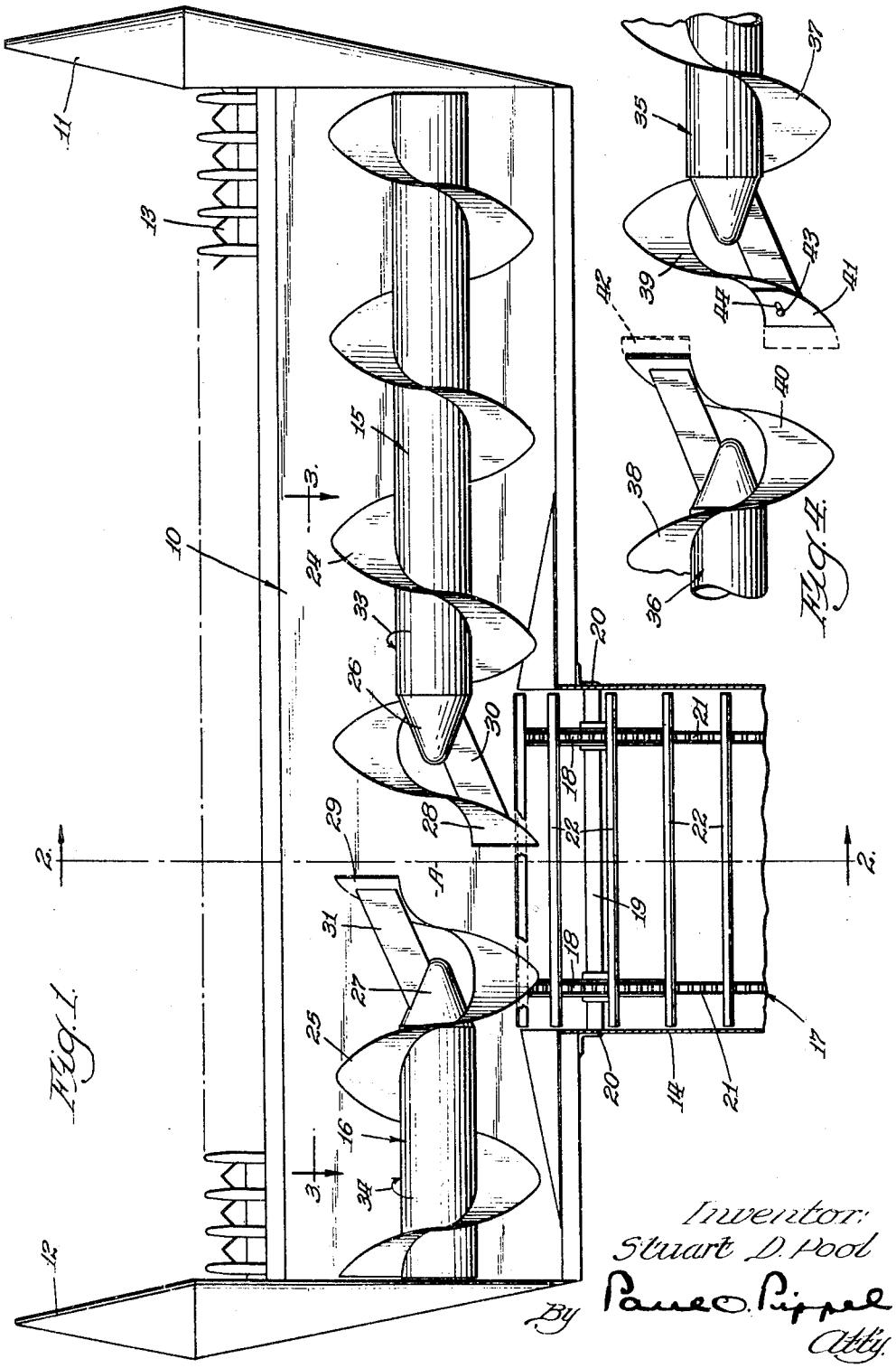

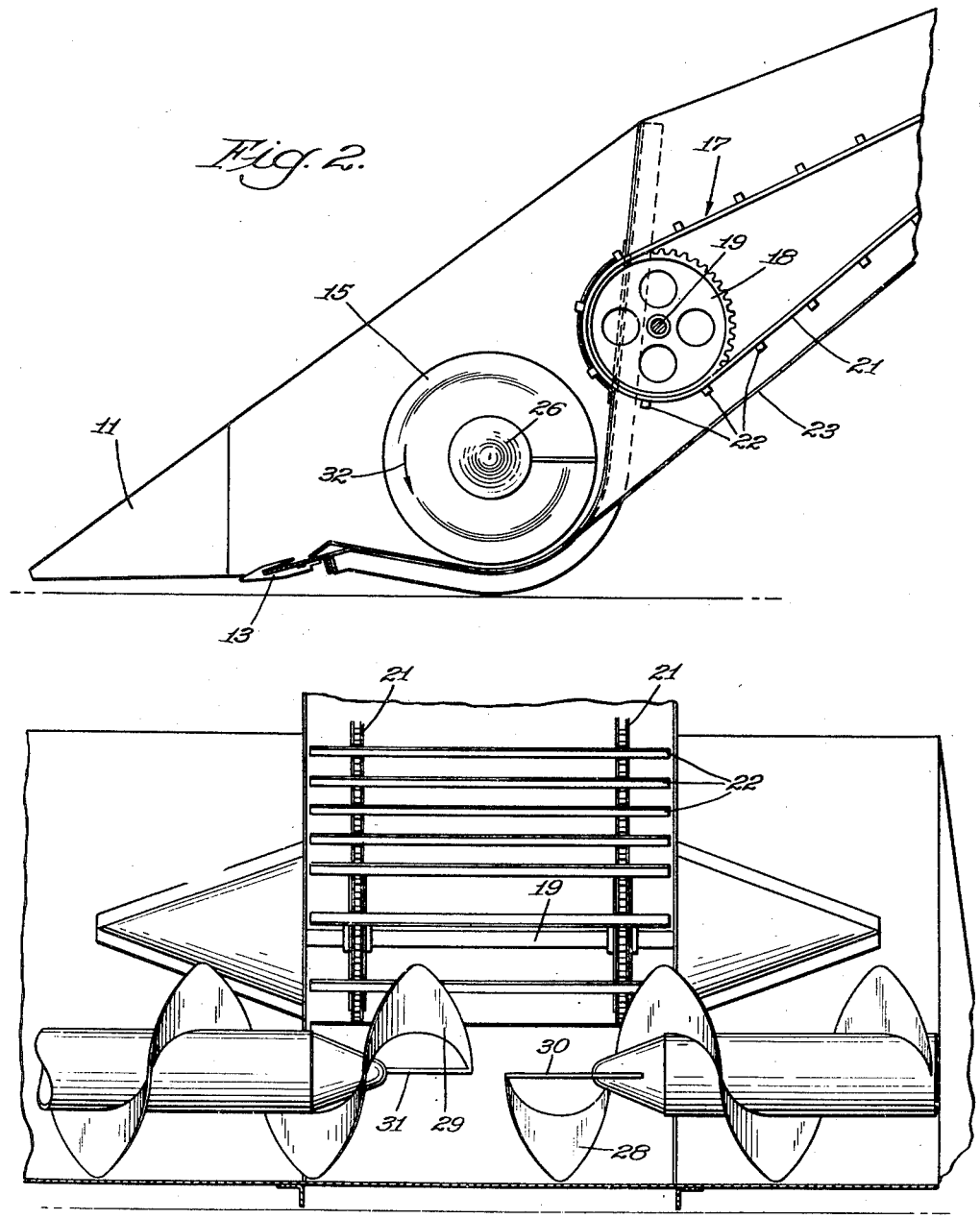

Patented Aug. 2, 1949

2,478,009

UNITED STATES PATENT OFFICE 2,478,009

COOPERATIVE FEEDING AUGER FOR HARVESTER PLATFORMS

Stuart D. Pool, Moline, Ill., assignor to International Harvester Company, a corporation of New Jersey Application December 21, 1946, Serial No. 717,752

3 Claims. (Cl. 198—104)

This invention relates to new and improved cooperative feeding augers for harvester platforms and has for one of its principal objects the provision of means for transporting grain transversely of the harvester platform and thence rearwardly into elevating conveyors.

An important object of this invention is to provide opposed feed augers adapted to feed material to a space between the ends of the opposed augers and having cooperative means on the ends of said augers to feed material positioned therebetween at right angles to the augers.

Another important object of this invention is the provision of an end means formed integrally with auger conveyors in order to cause the material being carried by the auger to be moved at an angle with respect to the direction of travel accomplished by the main portion of the auger.

A further object of this invention is to provide opposed feed augers with inner end portions arranged and constructed to provide for the feeding of material delivered to the inner ends in a direction transversely of the length of the auger feed.

A still further object of this invention is to provide for longitudinally adjustable inner end portions for opposed feed augers.

Other and further important objects of this invention will become apparent from the disclosures in the following specification and accompanying drawings, in which:

Figure 1 is a top plan view of a harvester platform having the opposed feed augers of this invention mounted thereon;

Figure 2 is a sectional view taken on the line 2—2 of Figure 1;

Figure 3 is a sectional view taken on the line 3—3 of Figure 1; and

Figure 4 is a top view detail of a modified form of the inner ends of opposed feed augers.

As shown in the drawings, the reference numeral 10 indicates generally a harvester platform or support having divider points 11 and 12 at the outer sides thereof. The forward edge of the platform 10 is equipped with a cutter bar 13 adapted to act as a sickle for standing grain causing the grain to fall rearwardly onto the platform 10 as the harvester progresses forwardly through a field of standing grain. The platform 10 is further provided with a discharge which includes a narrow relatively restricted portion 14 extending upwardly and rearwardly. This type of platform may be used with various harvesters, such as harvester threshers, and when it is so used the cut grain is transported laterally along the platform 10 by means of opposed feed augers 15 and 16 to a position between the ends thereof and adjacent the platform discharge 14. The augers are supported on the platform and are journaled at their outer ends in the divider points 11 and 12. Each of these augers terminates relatively closely to the center of the platform discharge portion 14 whereupon a conveyor 17 of the cross slat type elevates the grain into threshing mechanism (not shown).

There have been numerous methods employed for causing grain transported laterally of the platform 10 by means of opposed augers 15 and 16 to be picked up by the elevating conveyor 17. One solution was to employ a rearwardly running canvas type conveyor over the surface of the platform 10 at the point of discharge between the two augers 15 and 16. It has been discovered that the ends of the opposed augers could not be placed very close to each other for the reason that grain or other material fed directly toward each other would be repelled by each other, causing the grain to be thrown in a wild manner in all directions with the result that very little of the grain could be salvaged. Hence, on present machines the ends of opposed augers are relatively widely spaced with the result that there is a considerable lack of control over the grain during the period of transition from the platform augers to the rearwardly running conveyor illustrated by the conveyor 17.

In the present invention, the conveyor 17 is of the undershot type. Spaced sprockets 18 relatively large in diameter are mounted on a shaft 19 journalled in the side walls of the restricted portion 14 as shown at 20. Each of the sprockets 18 carries a chain 21 having cross slats 22 joining the chains and providing the aggressive movement for the grain or other material being transported thereby. The position of the large sprockets 18 and hence the forward surface of the undershot conveyor 17 is best shown in its relationship to the transversely extending augers 15 and 16 in Figure 2. It will be noted that the large forward surface of the undershot conveyor 17 is positioned slightly above and to the rear of the augers 15 and 16. As the augers feed the grain to a position centrally between the ends thereof, it is the purpose of the undershot conveyor 17 to pick up the grain and carry it down and beneath by the cross slats 22 and compress the grain or other material against the inclined bottom 23 on which the grain is carried upwardly and rearwardly.

The augers 15 and 16 of the present invention lie in opposed aligned axial relationship. The outer ends of the augers are journaled in the sides of the platform and their inner ends are unjournaled. Such unjournaled augers are commonly known as open-end augers which by their very nature have no supporting structures or bearings to hinder passage of material therethrough. The augers 15 and 16 have spiral flights 24 and 25 mounted thereon which extend over the full length thereof. The cores of the augers 15 and 16 are provided with inwardly tapering ends 26 and 27. Inward spiral extensions 28 and 29 form unbroken continuations of the spiral flights 24 and 25 respectively. Brace members 30 and 31 extend between the tapered cores 26 and 27 and the outer ends of the spiral flight extensions 28 and 29 respectively. These brace members 30 and 31 provide sufficient reinforcement for the flight extensions 28 and 29 so that they are capable of acting as paddles or grain handlers in transmitting grain, straw, or other material fed longitudinally of the augers to a position centrally thereof and rearwardly into the undershot conveyor 17. Taken on a longitudinal axis through the augers 15 and 16, the space between the inner ends of the tapered core ends 26 and 27 is relatively great whereas the space between the inner ends of the spiral flight extensions 28 and 29 is relatively small.

The augers of this invention must be properly timed so that the inner ends of the flights or paddles 28 and 29 are dimetrically opposed at all times. A single driving mechanism (not shown) is provided for both of the opposed augers and is arranged so that the augers are adapted to be driven in timed relationship which means merely that the uniform rotation of the augers insures that the paddles 28 and 29 remain diametrically opposed. The space between the inner ends of the augers 15 and 16 is very slight when the augers are viewed as shown in the front view in Figure 3. However, actually there is a diagonal space formed between the ends of the augers as indicated by the area A. As viewed in Figure 1, this diagonal space is inclined upwardly and toward the right from a position adjacent the undershot conveyor 17. When, however, the augers rotate, the diagonal area changes direction so that it is inclined in the opposite direction or forwardly and toward the left. Both of the augers 15 and 16 rotate downwardly at the forward end of the platform. This is indicated by the arrow 32 in Figure 2. The direction of rotation arrows 33 and 34 shown in Figure 1 also indicates that the augers turn downwardly at their forward edges and thence rearwardly and upwardly.

In the position of the augers as shown in Figure 1 the material cut by the auger or otherwise deposited on the platform is fed transversely by both augers 15 and 16. Each of the augers feeds material toward the narrow rearwardly inclined portion 14 of the platform 10. The material fed by the augers will be deposited in the diagonal space A and in this particular instance the paddle or flight extension 29 of the auger 16 will sweep downwardly and under, throwing the grain or other material rearwardly and upwardly into proximity to the undershot conveyor 17, whereupon the material is picked up by the cross slats 22 and elevated to other parts of the machine. In the succeeding cycle, the inclination of the area A will be changed and the end flight or paddle 28 of the auger 15 will then sweep downwardly and under, pushing the material now in the space between the two augers rearwardly in the same manner as that just described for the spiral extension 29. The diagonal space or area A defined by the diametrically opposed auger ends has its outline continuously redefined by rotation of the augers simulating the movement of the well-known wobble plate. From this arrangement it will be seen that at no time is the grain or material left to flounder without positive control and hence there is a uniform and positive feeding or sweeping of material from the opposed augers 15 and 16 to the undershot conveyor 17 at right angles thereto with a minimum of confusion and a minimum of operating mechanism.

It has been found that when operating with different grains it is desirable to vary the distance between the ends of the spiral flight extensions 28 and 29 and for that reason a modified structure has been shown in Figure 4. Opposed augers 35 and 36 are provided with regular spiral flights 37 and 38, and each is provided with additional spiral flight extensions 39 and 40 comparable to the spiral paddles 28 and 29 shown in Figures 1 and 3. However, extensible flight plate members 41 and 42 are shown adjustably fastened to the ends of the spiral flight extension paddles 39 and 40 respectively by means of bolts 43 passing through an elongated slot 44 in the extensible plate members 41 and 42 and fixedly attached to and forming a continuation of the spiral flight extensions 39 and 40, respectively. With this construction it is possible to vary the space between the inner ends of the spaced augers and also to cause the ends to overlap as shown in the dash line position of the extensible members 41 and 42.

Numerous details of construction may be varied throughout a wide range without departing from the principles disclosed herein, and I therefore do not propose limiting the patent granted hereon otherwise than as necessitated by the appended claims.

What is claimed is:

1. A feeding device comprising a support, a pair of opposed feeding augers having their outer ends journally mounted on said support and adapted to feed material to a space centrally therebetween, a transversely extending conveyor carried on said support and located in alignment with the central discharge space between the opposed augers, said augers including auger cores in axial alignment, spiral flights mounted on said cores, the inner ends of said cores being unjournaled and relatively widely spaced apart on a longitudinal axis of the axially aligned auger cores, said wide spacing substantially equal to the width of the transverse conveyor, said spiral flights having inward spiral extensions beyond the inner ends of the cores, and said inward spiral extensions positioned at diametrically opposed positions on said opposed cores and being relatively closely spaced apart on the same longitudinal axis thereby substantially crossing the transverse conveyor.

2. A device as set forth in claim 1 in which brace members are fastened to and extend between the cores and the inward spiral extensions for reinforcing the inward spiral extensions.

3. A grain feeding device comprising a support, a pair of opposed feeding augers mounted on said support and adapted to feed material to a space centrally therebetween, a transversely extending conveyor carried on said support and located in alignment with the central discharge space between the opposed augers, said augers including cores in axial alignment, spiral flights mounted on said cores, the inner ends of said cores being unjournaled and relatively widely spaced apart, said wide spacing substantially equal to the width of the transverse conveyor, said spiral flights having spiral extensions projecting inwardly beyond the inner ends of the cores, said spiral extensions positioned at diametrically opposed positions on said augers, an extensible flight plate associated with each of the spiral extensions flights, and means on said opposed augers and each of said extensible flight plates for adjustably fixing the plate longitudinally with respect to the ends of said flight extensions whereby the spiral extensions may be varied in length as desired.

STUART D. POOL.

REFERENCES CITED

The following references are of record in the file of this patent:

UNITED STATES PATENTS

| Number | Name | Date |
|---|---|---|
| 2,262,580 | Frankland | Nov. 11, 1941 |
| 2,262,906 | Raney et al. | Nov. 18, 1941 |
| 2,390,680 | Ausherman | Dec. 11, 1945 |

FOREIGN PATENTS

| Number | Country | Date |
|---|---|---|
| 110,300 | Australia | Apr. 2, 1940 |